United States Patent [19]

Eklund et al.

[11] Patent Number: 5,790,392
[45] Date of Patent: Aug. 4, 1998

[54] INTELLIGENT POWER SUPPLY WITH STAGED LOADING CAPABILITY

[75] Inventors: Barry Eklund, Berthoud; Paul Hays, Louisville; Allan Samson, Berthoud, all of Colo.

[73] Assignee: Micro Motion, Inc., Boulder, Colo.

[21] Appl. No.: 590,330

[22] Filed: Jan. 23, 1996

[51] Int. Cl.$^6$ .................................................. H02M 1/00
[52] U.S. Cl. ............................. 363/49; 363/78; 323/901
[58] Field of Search ...................... 363/49, 78; 323/901, 323/267; 307/38

[56] References Cited

U.S. PATENT DOCUMENTS

| | | | |
|---|---|---|---|
| 4,595,873 | 6/1986 | Musil | 323/222 |
| 4,999,759 | 3/1991 | Cavagnolo et al. | 363/21 |
| 5,021,727 | 6/1991 | Mashino | 322/7 |
| 5,084,666 | 1/1992 | Bolash | 323/283 |
| 5,119,014 | 6/1992 | Kronberg | 323/267 |

*Primary Examiner*—Peter S. Wong
*Assistant Examiner*—Adolf Berhane
*Attorney, Agent, or Firm*—Duft, Graziano & Forest, P.C.

[57] ABSTRACT

A power supply system includes a power distribution circuit (21) and a power converter circuit (22), an input power control circuit (24), a power utilization circuit (26) and a utilization control circuit (28). The power distribution circuit includes some limitation in delivering power to the power converter circuit. The input power control circuit initiates and controls the start-up of the power conversion circuit. The power utilization circuit and the utilization control circuit include a first storage capacitor (96), a first load (98), and a second capacitor (112). A voltage comparator (104) monitors voltage across the second capacitor to determine when the second capacitor is fully charged. A gate (126) receives signals from the voltage comparator and status logic to cause a switch (102) closure when the second capacitor is fully charged. The closing of the switch connects a second load (100) in parallel with the first load.

17 Claims, 3 Drawing Sheets

ABSTRACT# INTELLIGENT POWER SUPPLY WITH STAGED LOADING CAPABILITY

BACKGROUND OF THE INVENTION

1. Field of the Invention

This invention pertains to the field of power supplies that provide power to variable loads and are supplied by power distribution systems having some form of power limitation. More specifically, the power supply system of the present invention includes internal circuitry that, monitors input voltage to determine when it is appropriate to attempt starting, controls the power consumption during starting, and monitors output voltage and system conditions to determine when it is appropriate to add or remove power to a selected one of a plurality of load-bearing circuit components.

2. Statement of the Problem

Power distribution systems in industrial plants often include a central constant voltage power source, e.g., a battery, that is connected by long wires to various loads which utilize power from the power source. These long power distribution wires have an inherent resistance which can become so great that the wires fail to deliver an operational input voltage at the power-utilizing loads. Even though the power source is a constant voltage, the power-utilizing loads may receive a low input voltage because of the inherent wire resistance. Other forms of power distribution system limitations exist besides line resistance. An example is a power source designed to self-protect by limiting maximum output current or power. These power sources may also not deliver adequate operational power to the power-utilizing loads. Under these conditions, the power-utilizing loads may again receive low input voltage. Low input voltage problems are particularly severe when the power-utilizing loads are associated with measurement instrumentation, such as the Coriolis flow meters, densitometers, and viscometers that measure fluid parameters in conduit systems. The entire measurement system can fail even if only one instrument fails to achieve an operational state because a system calculation may require the missing values that derive from the one instrument. Additionally, low input voltage can cause one or more of the instruments to provide erroneous readings. This latter case is extremely problematic because the erroneous readings are difficult or impossible to detect, and one must question the integrity of measurement data that derives from instruments which experience low input voltage conditions.

It is often the case that a Coriolis flowmeter, e.g., the ELITE Model CMF300356NU and Model CMF300H551NU, which are available from Micro Motion of Boulder, Colorado, can be advantageously operated as a flowmeter to accurately measure a fluid being loaded into a rail car. A low input voltage supplied to a Coriolis flowmeter in such an application could disrupt its output readings and potentially cause an overflow, spilling the fluid. Thus, it is particularly important to minimize low input voltage conditions for Coriolis flowmeters.

Coriolis flowmeters are frequently installed in locations that are remote from civilization, e.g., a desert location for a producing oil or gas well, or on a plurality of fluid-retaining tanks that cover half a section of land. Various meters are installed at mandatory locations throughout these large facilities and power is provided to those locations by power distribution wires which, to cover the long distances, can be very long. Compounding the effect of long wire lengths is the fact that smaller diameter wire is often used, since it can be more cost effective, but is also associated with increased resistance. All of these factors contribute to increasing line resistance which is one cause of low input voltage problems. Additionally, with the installation of new equipment, it sometimes happens that existing power distribution wires become inadequate to the task of their intended use. The replacement of existing power distribution wires or the installation of new power distribution wires can be very costly.

The most common forms of low input voltage problems are associated with start-up conditions as opposed to steady-state operational conditions. Start-up conditions are characterized by greater and sometimes variable load conditions which require additional power to satisfy such things as the energy storage demands of charging capacitors and energizing inductors while the circuits start up. This is similar to the extra power that is required while an electric motor starts up. These demands temporarily draw additional input current while the power-utilizing loads reach a steady state. The additional start-up input current through high-resistance power distribution wires results in a corresponding drop of the input voltage supplied to the power-utilizing load. Therefore controlling the amount of additional input current drawn during start-up is critical to successfully meeting the temporary start-up demands without causing the input voltage to reach unacceptably low levels.

A power supply connected to a resistive power distribution system may be capable of meeting steady-state operational demands but it is not necessarily capable of meeting the additional peak demand during start-up. Consequently, the power-consuming circuits powered by the power supply may never achieve an operational steady-state because the power supply cannot meet the additional demand at start-up. For instance, the high initial start-up input current flowing through a resistive power distribution system to an electric motor can result in a low input voltage at the motor that fails to permit the motor to spin or achieve an acceptable rotational velocity.

U.S. Pat. No. 5,119,014 to Kronberg (1992) describes a system for sequential load addition. The system sequentially energizes a plurality of loads that typically use more energy at start-up than they do at a steady-state operational condition. A voltage ramp generator is used to provide a time-varying signal to a plurality of voltage comparators. Each comparator activates in response to the signal reaching a predetermined voltage magnitude. Activation of a voltage comparator causes a transfer of power to a selected load corresponding to the voltage comparator. Thus, a plurality of electric motors are activated in a time delay sequence. Even so, the system fails to monitor each load to ascertain whether it has achieved a steady state prior to activation of the next sequential load. Thus, the time delay periods must be excessively long, or else premature load activation continues to produce excessive demands on the power supply.

There remains a true need for an intelligent power supply system that facilitates sequential loading of different circuit components with minimal time delay and without placing excessive demands on the power supply at startup. Additionally, there remains a need for an intelligent power supply system that can remove loads from the system when the available power is insufficient to provide an operational magnitude of voltage or current to the loads.

SOLUTION

The present invention overcomes the above problems by providing an intelligent power supply which can identify the conditions that exist and determine when it is appropriate to apply power and at what rate to apply power to a particular load. Similarly, the power supply determines when power must be removed from an existing load and continuously acts upon these conditions to apply and remove power as required.

In broad terminology, a power supply system according to the present invention includes start-up control circuits that are used to control the rate of power loading by allocating power to various loads in a sequence of small start-up events, as opposed to one large start-up event that draws excessive power. The sequential or staged utilization of power for first charging up circuits then loading of a plurality of circuits minimizes peak power demand at start-up. The sequential charging then loading is preferably automated by the use of analog circuitry that directly monitors operational voltage conditions in the various circuit branches. Capacitors that are charged by direct current are particularly preferred components for use in providing the timing delays or intervals that separate the sequential loading of respective circuit components during startup. Voltage comparators are particularly preferred to monitor various voltages that indicate various phases of operating conditions and to initiate the next appropriate action, such as applying power to additional circuit components.

The power supply system preferably includes a power converter. A power distribution system provides power to the power converter from a power source through power distribution wires. A power utilization circuit receives power from the power converter. A utilization control circuit monitors output voltage and transmitter conditions and provides control for adding loads. An input power control circuit monitors the input voltage to the power converter and provides a controlled-rate startup signal to the power converter when a predetermined turn-on threshold or operational input voltage is reached. The power converter includes a control unit that receives the signal and interprets the same to induce corresponding actions in the power converter. The power converter prevents the transmission of power to the power utilization circuit if a low input voltage is detected by the input power control circuit.

In the case where an operational input voltage does exist, the power converter transmits power to the power utilization circuit from the power distribution system. Likewise, the power utilization circuit receives power transmitted by the power converter from the power distribution system. The power utilization circuit includes a first load and a second load, but the second load is initially disconnected from the power utilization circuit. A first capacitor and a second capacitor are positioned in parallel with the first load. The second capacitor is provided with a series resistor, which retards the charging of the second capacitor relative to the first capacitor. A voltage comparator monitors the charge across the second capacitor, and provides a logic signal that indicates when the voltage across the second capacitor has reached a threshold level. Once the threshold level has been reached, this logic signal is combined with a logic signal indicating the condition of the remainder of the system. If all conditions are operational an activation signal causes a switch to close. The closing of the switch connects the second load in parallel with the first load.

In preferred embodiments, the voltage comparator continues to monitor the voltage in the power utilization circuit, and provides a deactivation signal whenever the voltage falls below a turn-off threshold value, e.g., a voltage that is insufficient to permit satisfactory operation of a Coriolis meter or signal transmitter. In response to receipt of the deactivation signal, the second load is disconnected by opening the switch.

Other salient features, objects, and advantages will be apparent to those skilled in the art upon a reading of the discussion below in combination with the accompanying drawings.

DETAILED DESCRIPTION OF THE PREFERRED EMBODIMENT

Figure 1:
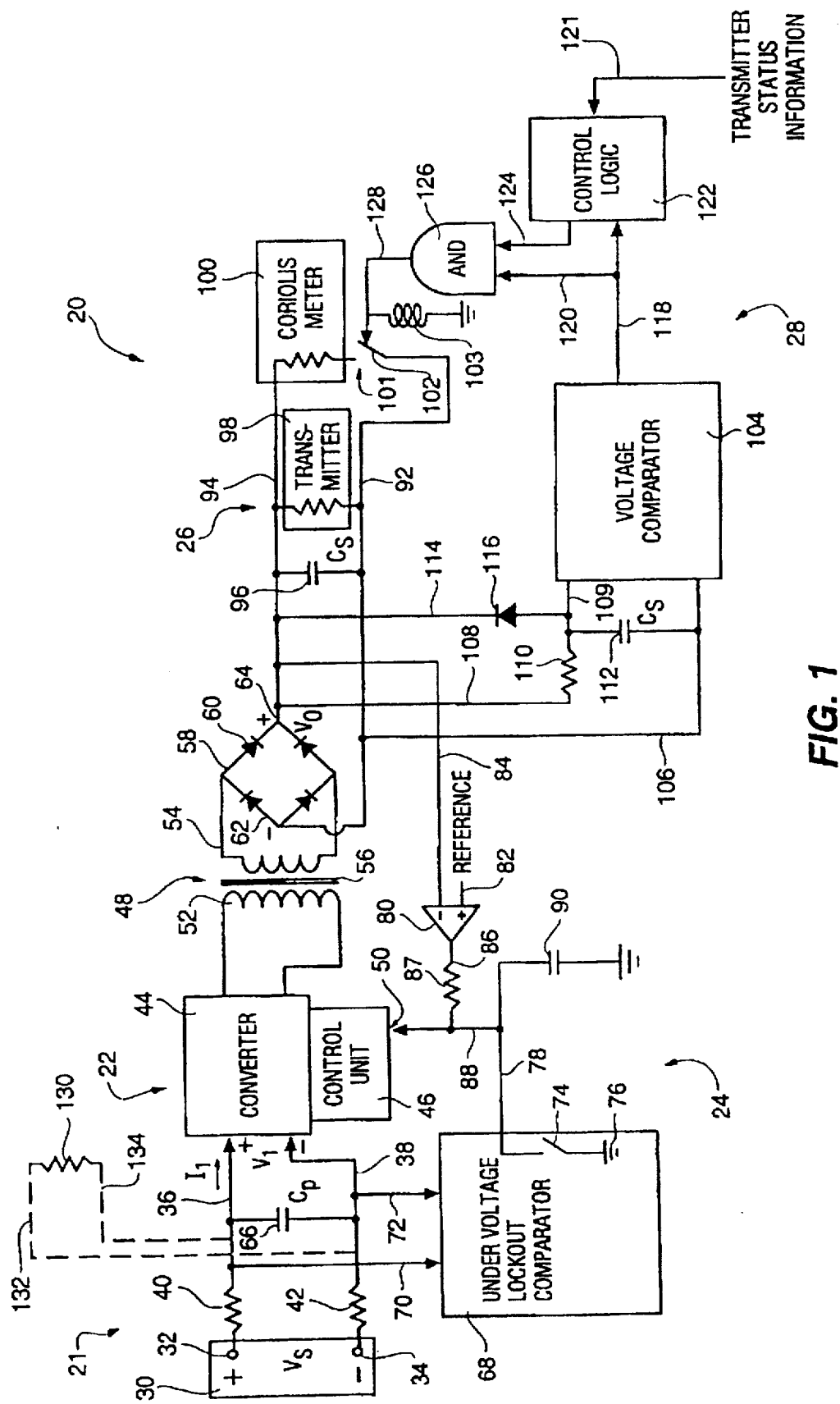
FIG. 1 depicts a schematic circuit diagram of a power supply system according to the present invention.

FIG. 1 depicts a power supply system 20. The major components of system 20 include a power distribution circuit 21, a feedback-regulated power converter circuit 22, an input power control circuit 24, a power utilization circuit 26, and a utilization control circuit 28.

Power distribution circuit 21 preferably includes a direct current power source 30 having a positive terminal 32 and a negative terminal 34. A substantially constant voltage or potential difference $V_S$ preferably exists between terminals 32 and 34. Conductors 36 and 38 respectively have inherent resistances 40 and 42, and are the power distribution wires connecting power source 30 to converter 44. Converter 44 includes a conventional control unit 46 that regulates power transmission from converter 44 to transformer 48. In the preferred embodiment, converter 44 is a model LT 1171 manufactured by Linear Technology. When control unit 46 receives a signal (e.g., feedback signal) at contact 50 it regulates the transmission of power delivered by converter 44 proportional to that signal. A larger signal at contact 50 causes converter 44 to deliver more power to transformer 48 and a zero (e.g. ground) voltage signal at contact 50 stops converter 44 from transmitting any power to transformer 48. Output voltage 64 is fed back over conductor 84 to operational amplifier 80 and is subtracted from a reference voltage 82 by operational amplifier 80 to create a feedback signal on conductor 86. Under operational steady state conditions, a feedback signal on conductor 86 is conducted to contact 50 through resistor 87 and conductor 88. Transformer 48 includes a primary winding 52 and a secondary winding 54. A rectifier 58 includes four diodes (e.g., diode 60) connected to winding 54. Primary side capacitor 66 is connected between conductors 36 and 38 upstream of converter 44. Thus, power converter circuit 22 receives power from power source 30 through conductors 36 and 38, converts power from DC to AC at converter 44, applies the AC voltage at transformer 48, and rectifies AC to DC at rectifier 58. Additional elements (not depicted) are preferably installed immediately downstream from transformer 48 to further process the DC current as needed. These additional elements can include, for example, a filter and a regulator to smooth the output of rectifier 58.

Input power control circuit 24 includes an undervoltage lockout comparator 68, which connects to conductor 36 through conductor 70, and to conductor 38 through conductor 72. There exists a potential difference between conductors 70 and 72, and this potential difference is equal to the voltage across primary side capacitor 66. Undervoltage lockout comparator 68 includes switch 74 that is normally closed but opens when the potential difference between conductors 70 and 72 reaches a turn-on threshold value, e.g., at least eleven volts. Comparator 68 has a large voltage hysteresis that causes switch 74 to remain open until the voltage between conductors 70 and 72 drops below a turn-off threshold value (e.g., eight volts) which is lower than the turn-on threshold value. The closed position of switch 74 grounds contact 50 through conductors 78 and 88 causing control unit 46 to stop power transmission through converter 44. Before startup, switch 74 of undervoltage lockout comparator 68 is normally closed. Thus, conductors 78 and 88 are grounded. Undervoltage lockout comparator 68 opens switch 74 when the voltage between conductors 70 and 72 reach a turn-on threshold level. Current from amplifier 80 charges capacitor 90 through resistor 87. The exponential charging of capacitor 90 rises gradually from ground as capacitor 90 charges through resistor 87. This charging delivers a gradually rising signal at contact 50 over conductor 88 to control unit 46 which regulates converter 44 to gradually increase power transmission to the transformer 48 and finally to power utilization circuit 26. This results in a gradual, smooth increase in power from zero to the operational steady-state conditions where the signal at contact 50 is determined by feedback signal 86. Power utilization circuit 26 includes a negative conductor 92 and a positive conductor 94 connecting in parallel a first storage capacitor 96, transmitter 98 and a Coriolis flowmeter 100. Transmitter 98 and Coriolis meter 100 are preferably designed for cooperative use, e.g., transmitter 98 transmits measurement signals derived from Coriolis meter 100 to a controller (not depicted) or other such device. Relay 101 including switch 102 and coil 103 can be opened to prevent current from flowing through Coriolis meter 100 from circuit 26, or switch 102 can be closed to add Coriolis meter 100 to circuit 26. Coriolis meter 100 preferably places a greater load on circuit 26 than does transmitter 98, i.e., at start-up the load at transmitter 98 is a minimum load and the load added by Coriolis meter 100 is a maximum load. As depicted in FIG. 1, transmitter 98 and Coriolis meter 100 have corresponding resistive loads, however, these loads are more often complex loads that also include inductance and capacitance characteristics.

Utilization control circuit 28 includes voltage comparator 104, AND gate 126, and control logic 122 which combine to control when the second load is applied or removed. Voltage comparator 104 receives voltage from conductors 92 and 94 over conductors 106 and 108. Resistor 110 is connected in series with capacitor 112.

Conductor 114 connects capacitor 112 to positive conductor 94 through a diode 116 that permits flow of current from capacitor 112 into conductor 94, but does not permit current to flow from conductor 94 over conductor 114 to capacitor 112. Diode 116 ensures that, upon shut down of power to power utilization circuit 26, capacitor 112 can discharge by the draining of stored charge into capacitor 96 and the load of transmitter 98. This is important because capacitor 112 should be charged at a voltage less than or equal to the voltage of capacitor 96 at the time of startup so that its charge level lags behind the charge level of capacitor 96. Voltage comparator 104 determines when the voltage from conductors 106 and 108 has reached a magnitude that is sufficient for the operation of Coriolis meter 100. Voltage comparator 104 then provides an activation signal over conductor 118 to control logic circuit 122. Control logic circuit 122 is preferably an integral part of transmitter 98, but is shown as a separate element in FIG. 1. Conductor 124 connects control logic circuit 122 to AND gate 126. The output of AND gate 126 is connected to switch 102 over conductor 128, and has the following logic table:

| Input 120 | Input 124 | Output 128 |
| --- | --- | --- |
| 1 | 0 | 0 |
| 1 | 1 | 1 |
| 0 | 1 | 0 |
| 0 | 0 | 0 |

Thus, an activation signal representing a logical 1 is supplied from the output of voltage comparator 104 to AND gate 126 over conductors 118 and 120. This signal is also supplied to control logic 122 over conductor 118. Control logic 122 also receives transmitter status information 121. Transmitter status information 121 may actually comprise a plurality of logical inputs indicating the status of various components of power utilization circuit 26 all generated by transmitter 98. For example, transmitter 98 may, upon completion of diagnostic routines, deliver a signal to control logic 122 over transmitter status information 121 indicating that Coriolis meter 100 should not be powered. If a logical 1 is supplied from voltage comparator 104 over conductor 118 and transmitter status information 121 indicates no problems, then control logic 122 applies a logical 1 over conductor 124 so that two logical 1 values are applied to the input conductors 120 and 124. AND gate 126 turns on and applies an activation voltage representing a logical 1 to conductor 128. This activation voltage is applied to relay 101, and closes switch 102. Similarly, AND gate 126 generates a logical 0 value (i.e., a deactivation signal) to open switch 102 in the event that either input conductors 120 or 124 do not provide AND gate 126 with signals representative of logical 1 values.

Figure 2:
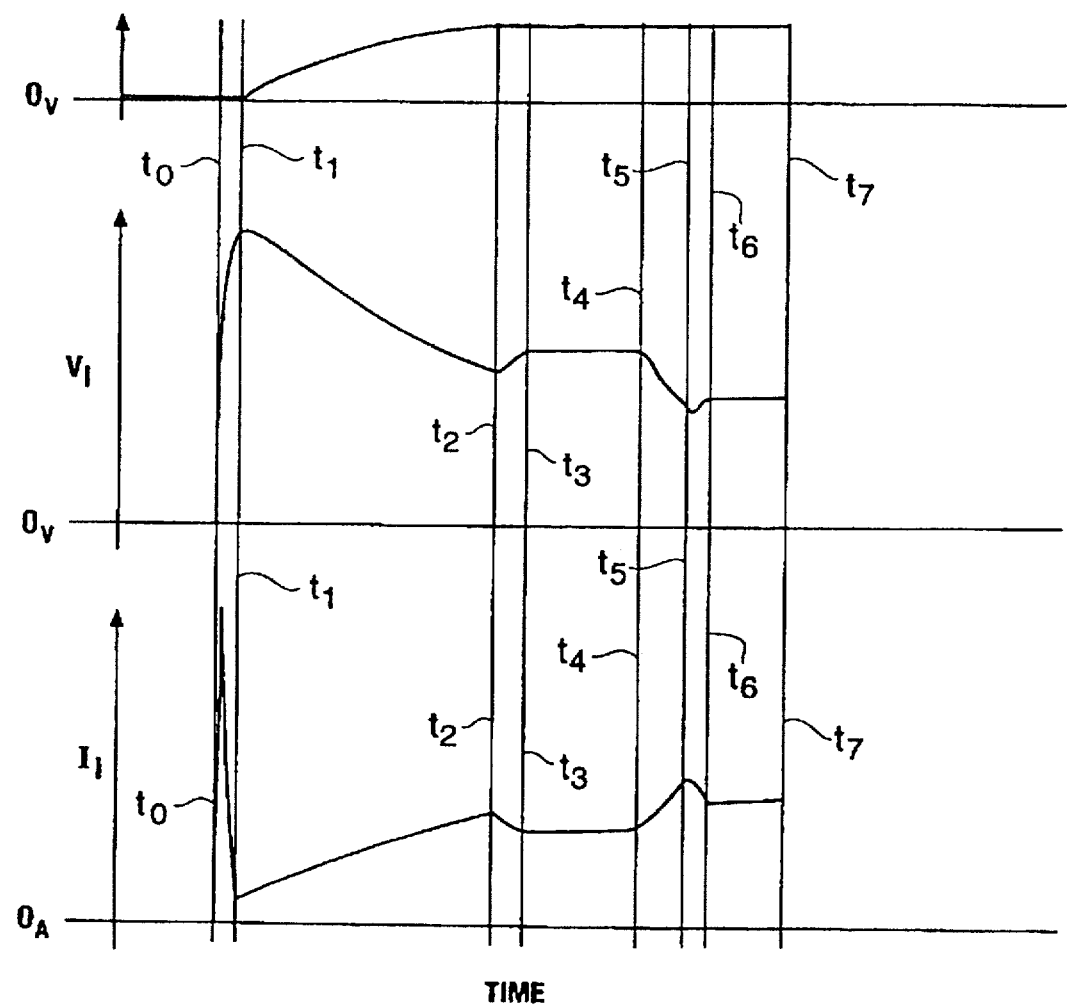
FIG. 2 depicts a plurality of qualitative time-dependent voltage and current relationships pertaining to start-up of the FIG. 1 power supply system.
Figure 3:
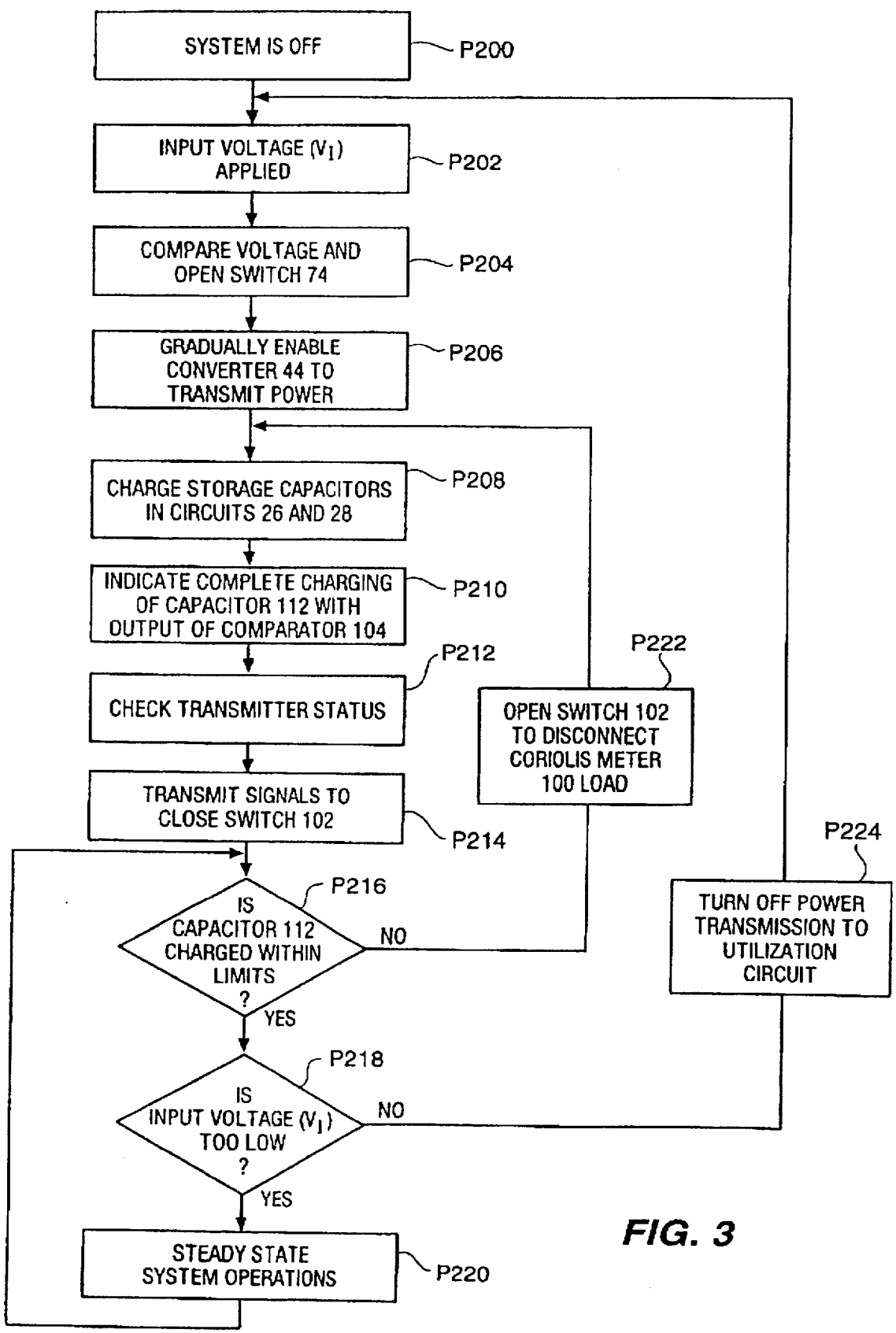
FIG. 3 depicts a process flow chart for the normal operation of the FIG. 1 system.

FIG. 2 depicts exemplary time-dependent relationships that exist during start-up of system 20 between input current ($I_I$) at the input of converter 44 through conductor 36, input voltage ($V_I$) at the input of converter 44 between conductors 36 and 38, and output voltage ($V_O$) in power utilization circuit 26 between conductors 94 and 92. FIG. 3 depicts a process flow chart that describes the operation of system 20. The discussion below emphasizes the operation of system 20 in the context of the time-dependent relationships in FIG. 2, which derive from the interaction of system components in FIG. 1.

With reference of FIG. 2 and 3, in Step P200 ($t<t_0$), power supply system 20 is initially offline. In this state, system 20 requires charging either because it has been disconnected from power source 30 or because it has never been connected. Disconnection and reconnection of power source 30 is preferably to be accomplished by a manual switch (not depicted) in converter 44 or power source 30. Switch 74 is normally closed in this offline condition. Power utilization circuit 26 is not operational because conductor 88 provides a logical 0 to contact 50 by virtue of its connection to ground through switch 74. Similarly, any charge in capacitor 90 has been drained over conductor 78 and switch 74. Switch 102 is normally open at this step so Coriolis meter 100 is isolated from the power utilization circuit.

In Step P202 ($t_0<t<t_1$), power is first applied to system 20 from power source 30 at a time $t_0$ (see FIG. 2). Undervoltage lockout comparator 68 maintains switch 74 in the closed position while primary side capacitor 66 charges until an operational voltage is reached in conductors 70 and 72 at time $t_1$.

In Step P204 ($t=t_1$), lockout comparator 68 opens switch 74 at time $t_1$ as a consequence of undervoltage lockout comparator 68 having determined that the voltage between conductors 70 and 72 equals or exceeds a predetermined turn-on threshold level or magnitude. This predetermined voltage threshold is selected to provide an operational input voltage ($V_I$) to converter 44. The opening of switch 74 eliminates the connection to ground 76 in voltage control circuit 24.

In Step P206 ($t_1<t<t_2$), output voltage ($V_O$) is gradually increased as power is transmitted to power utilization circuit 26. Operational amplifier 80 subtracts feedback voltage 84 from reference voltage source 82 and generates a feedback voltage 86 because power utilization circuit 26 at this time has a no voltage. Current from operational amplifier 80 gradually charges capacitor 90 through resistor 87 and conductor 88. The voltage of capacitor 90 is transmitted to contact 50 over conductor 88 and provides a gradually increasing voltage to control unit 46. Control unit 46 causes converter 44 to gradually transmit more power from power source 30 over conductors 36 and 38 to transformer 48. Converter 44 converts the DC current in conductors 36 and 38 to AC. Transformer 48 transforms the voltage to an operational level for use by power utilization circuit 26. Rectifier 58 converts the AC to DC. The gradual increase of power through converter 44 results in a gradual increase of input current ($I_I$). The gradually increasing input current ($I_I$) is conducted to converter 44 from terminal 32 of the constant-voltage power source 30 through power distribution resistor 40 and conductor 36 to converter 44. Similarly, the same gradually increasing input current ($I_I$) returns from converter 44 through conductor 38 and power distribution resistor 42 to terminal 34 of power source 30. The input current ($I_I$) causes a gradually increasing voltage drop across power distribution resistors 40 and 42 resulting in a corresponding decrease of input voltage ($V_I$) between conductors 36 and 38. During this period P206, storage capacitor 96 begins to charge and provides increasing output voltage ($V_O$) to transmitter 98 of the power utilization circuit 26.

At a time $t=t_2$, the charging of first storage capacitor 96 is complete. The charging of the second capacitor 112 in utilization control circuit 28 is partially complete. Switch 102 continues to be open isolating Coriolis meter 100 from power utilization circuit 26. First storage capacitor 96 and transmitter 98 receive power from conductors 92 and 94. Second capacitor 112 receives power from conductors 106 and 108. When capacitors 96 and 112 are equally sized, first storage capacitor 96 charges first because full charging of second capacitor 112 is delayed by the provision of series resistor 110 which is sized to assure appropriate delay. Once the controlled increase of input power by capacitor 90 is complete, output voltage ($V_O$) is maintained constant by the feedback-regulated converter 22 which creates a signal at contact 50 to cause the control unit 46 to adjust converter 44 power transmission to transformer 48.

In Step P208 ($t_2<t<t_3$), the process of charging second capacitor 112 is continued and input current ($I_I$) decreases slightly because the need for input power to charge storage components has decreased since capacitor 96 is charged. The decrease of input current ($I_I$) results in a slight increase of input voltage ($V$)$_I$.

In Step P210 ($t=t_3$), voltage comparator 104 determines at $t_3$ that the voltage difference between conductors 106 and 108 and across second capacitor 112 is sufficient to operate Coriolis meter 100, i.e., the voltage in power utilization circuit 26 (with switch 102 open) has built up to a predetermined threshold value. Voltage comparator 104, accordingly, at $t_3$ provides a voltage signal representing a logical 1 to AND gate 126 and control logic 122 over conductors 118 and 120. Still, AND gate 126 cannot close switch 102 until a corresponding logical 1 value is received from control logic 122 over conductor 124.

In Step P212 ($t_3<t<t_4$), power demand is constant because all storage capacitance is charged and load is constant. Thus, a plateau exist in $V_I$, and $I_I$ over the interval from $t_3$ to $t_4$ while control logic 122 determines from transmitter status information 121 that all conditions are satisfactory to start Coriolis meter 100. The delay over the interval from $t_3$ to $t_4$ can, for example, permit transmitter 98 to execute self-diagnostic algorithms, or to heat internal components to operational temperatures. Alternatively, the plateau interval from $t_3$ to $t_4$ can be eliminated.

In Step P214 ($t_4<t<t_5$), control logic 122 provides a logical 1 to conductor 124 at time $t=t_4$. Thus, AND gate 126 provides an output voltage that closes switch 102. Power utilization circuit 26 is redefined at this instant to include the complex load of Coriolis meter 100. Coriolis meter 100 consumes power as it begins to operate. Coriolis meter 100 includes an internal tube oscillator device (not depicted) which acts much as an electric motor acts, i.e., a large initial demand occurs for input current ($I_I$) across the time interval from $t_4$ to $t_5$ which produces a corresponding drop in voltages $V_I$.

From $t_5$ to $t_6$, the oscillator reaches its optimum frequency and amplitude and the demand for input current ($I_I$) decreases with a corresponding increase of input voltage ($V_I$) System 20 operates at a substantially steady state over the interval from $t_6$ to $t_7$ (step P220).

In step P216, voltage comparator 104 continuously monitors the voltage across second capacitor 112 to determine whether the voltage drops below a delimiting value. This delimiting value is preferably about thirty percent less than the threshold value that causes voltage comparator 104 to transmit a signal closing switch 102, but the voltage is still acceptable for the operation of transmitter 98 and Coriolis meter 100. If in step P216, the voltage falls below this delimiting value then step P222 occurs otherwise step P218 occurs.

In step P222, the voltage comparator 104 changes its output along conductors 118 and 120 to reflect a logical 0. Thus, switch 102 is opened to remove the load corresponding to Coriolis meter 100 from power utilization circuit 26. The analog circuitry of system 20 is then placed in substantially the same state that existed in Step P208, with capacitor 112 being charged as a prerequisite to the closing of switch 102.

In step P218, undervoltage lockout comparator 68 continuously monitors the input voltage ($V_I$) between conductors 36 and 38 to determine whether the voltage drops below a turn-off threshold value. This turn-off threshold value is preferably significantly less than the turn-on threshold value that causes undervoltage lockout comparator 68 to open switch 74 and initiate start up, however it is acceptable for the operation of transmitter 98. If in step P218, the voltage falls below this turn-off threshold value then step P224 occurs otherwise the system remains in steady conditions of step P220.

In step P224, the undervoltage lockout comparator 68 closes switch 74 which grounds (e.g. zero) contact 50 over conductors 88. The ground signal is received by control unit 46 which causes converter 44 to stop transmitting power to transformer 48. The closed switch 74 also grounds capacitor 90 over conductor 78 which discharges capacitor 90. The analog circuitry of system 20 is then placed in substantially the same state that existed in Step P202, with input voltage ($V_I$) being below a voltage acceptable for the operation of transmitter 98.

For simplicity, Steps P216 and P218 are shown in FIG. 3 as sequential events, however, they are actually monitoring continuously and can cause subsequent steps P222 and P224, respectively, at any time. Steps P218 and P224 will over ride all steps after power is applied (P200).

It will sometimes be desirable to operate power converter circuit 22 in combination with additional loads. The present invention contemplates, for example, a third load (not depicted) that may be connected in parallel with transmitter 98 and Coriolis, meter 100. In this case, utilization control circuit 28 is replicated for the third load. The replicated utilization control circuit is identical to circuit 28, except that switch 102 in the replicated circuit controls current flow through the third load. Additionally, resistor 110 in the replicated circuit has a resistance greater than resistor 110 of circuit 28. Additional complex loads, e.g., load 130, can also be connected to divert power from power converter circuit 22 over paths 132 and 134. This power drain (especially at the start-up of load 130) produces a corresponding input voltage ($V_I$) drop between conductors 36 and 38. If the input voltage ($V_I$) remains above the turn-off threshold value for the undervoltage lockout comparator 68 then operation continues unchanged. If the input voltage ($V_I$) drops below the turn-off threshold value for the undervoltage lockout comparator 68 then the analog circuitry of system 20 is then placed in substantially the same state that existed in Step P224. This leads to step P202 with input voltage ($V_I$) being below a voltage acceptable for the operation of transmitter 98.

The power system 20 operates in a very different manner from prior art systems that do not have utilization control circuit 28. In prior art systems, all elements of utilization control circuit 28 from conductors 121, 106, 108, and 114 to relay 101 are not present. Switch 102, if it exists, is always closed. As previously mentioned, Coriolis meter 100 contains an oscillator that vibrates a pair of tubes. The oscillator is analogous to an electric motor because it draws a very high initial current surge, but the current flow stabilizes at a reduced level once the oscillator has reached an operational vibration frequency and amplitude. The oscillation of flow tubes within Coriolis meter 100 is an essential feature of the metering operation. The high power demand of the Coriolis meter 100 as it starts up causes an equal corresponding power demand at the inputs of converter 44. The increased demand of power causes increased input current ($I_I$) and that input current flows to converter 44 from terminal 32 of the constant-voltage power source 30 and passes through power distribution resistor 40 and conductor 36 into converter 44. Similarly, the same increasing input current ($I_I$) returns from converter 44 through conductor 38 and power distribution resistor 42 to terminal 34 of power source 30. The increasing input current ($I_I$) causes an increasing voltage drop across power distribution resistors 40 and 42 resulting in a corresponding decrease of input voltage ($V_I$) between conductors 36 and 38. This voltage drop caused by the high input current ($I_I$) flow sometimes produces a situation where insufficient input voltage ($V_I$) and input current ($I_I$) are available at converter 44 to supply power demanded by meter 100 for purposes of driving the oscillator to its design oscillation frequency and amplitude. Thus, capacitor 96 never fully charges to an operational voltage for transmitter 94 and Coriolis meter 100.

Those skilled in the art will understand that the preferred embodiments, as hereinabove described, may be subjected to apparent modifications without departing from the true scope and spirit of the invention. The inventors, accordingly, hereby state their intention to rely upon the Doctrine of Equivalents, in order to protect their full rights in the invention.

We claim:

1. A power supply system having a start-up delay circuit for use in allocating a limited power supply to various loads, comprising:
   a power input circuit;
   means for supplying power to said power input circuit;
   means for receiving power from said power input circuit, said power receiving means including a first load and a second load;
   means for detecting an amplitude of an input side voltage applied to said power input circuit;
   means, responsive to said determination of said amplitude, for preventing power transmission from said power input circuit to said first load when said applied voltage has an amplitude less than a threshold value, and for permitting said power transmission to said first load when said amplitude at least equals said threshold valve.
   means for providing an activation signal indicative of when an operational voltage exists across said first load; and
   means responsive to receipt of said activation signal for delaying application of power to said second load until such time as said operational voltage exists across said first load.

2. The system as set forth in claim 1 including means for disconnecting said second load from said receiving means when voltage on said receiving means falls below a delimiting value.

3. The system as set forth in claim 1 wherein said delaying means includes a first storage capacitor in parallel with said first load, said second load, and a second capacitor preceded by a series resistor.

4. The system as set forth in claim 3 wherein said delaying means includes means for comparing a voltage across said second capacitor against a voltage representative of an operational voltage of said first and second loads.

5. The system as set forth in claim 4 wherein said delaying means includes means responsive to receipt of said activation signal for closing a switch to bring said second load online as part of said receiving means.

6. The system as set forth in claim 5 wherein said first load is a transmitter having a control logic unit and said second load is a Coriolis meter.

7. The system as set forth in claim 5 wherein said closing means includes an AND gate having input terminals connected to said voltage comparator and said control logic unit.

8. The system as set forth in claim 3 wherein said delaying means includes means for comparing a voltage across said second capacitor against a voltage representative of an operational condition on said receiving means to provide a deactivation signal representative of a non-operational voltage condition in said receiving means.

9. The system as set forth in claim 8 wherein said delaying means includes means responsive to receipt of said deactivation signal for opening a switch to bring said second load offline.

10. The system as set forth in claim 9 wherein said first load is a transmitter having a control logic unit and said second load is a Coriolis meter.

11. The system as set forth in claim 10 wherein said opening means includes an AND gate having input terminals connected to said voltage comparator and said control logic unit.

12. The system as set forth in claim 1 wherein said power input circuit includes a DC to AC power converter, a transformer, and a rectifier, in combination providing means for changing a direct current voltage derived from a power source.

13. The system as set forth in claim 1 including means for terminating transmission of power from said power input circuit to said receiving means when voltage on said power input circuit falls below a predetermined level.

14. A method of controlling system load additions to avoid excessively high power demands at startup, said method comprising the steps of:

charging a first storage capacitor in parallel with a first load;

establishing a voltage difference across a series combination of a resistor and a second capacitor, said series combination of said resistor and said second capacitor being in parallel with said first load;

providing an activation signal representative of said voltage difference having reached a threshold level; and connecting a second load in parallel with said first load, in response to receipt of said activation signal.

15. The method as set forth in claim 14 wherein said establishing step includes a step of delaying current flow into said second capacitor.

16. The method as set forth in claim 14 wherein said providing step includes a step of monitoring said voltage.

17. The method as set forth in claim 14 including a step of disconnecting said second load when said voltage falls below a delimiting value.

* * * * *